United States Patent [19]

Van Alphen et al.

[11] 4,240,128
[45] Dec. 16, 1980

[54] ALUMINUM CATHODE FOIL FOR ELECTROLYTIC CAPACITORS INCLUDING A COPPER CONTENT

[75] Inventors: Leendert G. Van Alphen, Nijmegen; Justinus W. H. G. Slakhorst, Hengelo; Pieter M. Vogel, Zwolle, all of Netherlands

[73] Assignees: Aluminium Industrie Vaassen B.V., Vaassen, Netherlands; U.S. Philips Corporation, New York, N.Y.

[21] Appl. No.: 945,935

[22] Filed: Sep. 26, 1978

[30] Foreign Application Priority Data

Oct. 3, 1977 [NL] Netherlands .......................... 7710775

[51] Int. Cl.$^3$ .......................... B01J 17/00; H01G 9/00
[52] U.S. Cl. .................................... 361/433; 361/271; 29/570
[58] Field of Search .................. 361/423, 271; 29/570

[56] References Cited

U.S. PATENT DOCUMENTS

| 3,498,765 | 3/1970 | Hunter | 361/433 |
| 3,599,053 | 8/1971 | Iida et al. | 361/433 |
| 3,665,260 | 5/1972 | Kirkpatrick | 361/433 |
| 3,742,369 | 6/1973 | Douglass | 361/433 |
| 3,899,723 | 8/1975 | Muhlhausser | 361/433 |
| 4,105,513 | 8/1978 | Nishino et al. | 361/433 |
| 4,121,949 | 10/1978 | Walters | 361/433 |

Primary Examiner—Andrew J. James
Attorney, Agent, or Firm—Thomas A. Briody; Robert T. Mayer; Paul R. Miller

[57] ABSTRACT

Cathode foil for electrolytic capacitors is formed of aluminium having a copper content between 0.15 and 5.7 weight % and a total amount of contaminations of not more than 2 weight %.

7 Claims, No Drawings

ALUMINUM CATHODE FOIL FOR ELECTROLYTIC CAPACITORS INCLUDING A COPPER CONTENT

The invention relates to aluminum cathode foil for an electrolytic capacitor and to the capacitor provided with such a cathode foil.

An electrolytic capacitor consists of an aluminum anode provided by means of anodic oxidation a dielectric aluminum oxide skin, an aluminum cathode provided by means of etching a large surface area and an electrolyte solution. The most customary embodiment is the aluminum wound capacitor, wherein the anode foil and the cathode foil are rolled with an interleaved, so-called separator of an insulating material into a wound body. The wound body is impregnated with an electrolyte solution and encapsulated.

It is important to have the desired capacitance at as small a surface area as possible, which means that the metal surface to be oxidized (forming) must be as large as possible. To this end the surface of the anode is subjected to an etching operation, which is usually effected electrolytically. To obtain a large capacitance per surface unit it is important that the surface area of the cathode foil which is encapsulated in the non-formed state in normal capacitors is likewise increased by etching and that roughening and capacitance respectively are comparable to the roughening and capacitance of the anode foil. In this way the total capacitance of the capacitor is determined to a large extent by the anode capacitance alone as the cathode capacitance increases.

Aluminum of a very high purity, namely Al99.99%, which can be formed very satisfactorily is usually used for the anode foil. A good dielectric oxide layer is obtainable thereon by means of anodic oxidation.

For the cathode foil preference is given to aluminum foil which is less easy to be formed. In accordance with the U.S. Pat. No. 3,899,723 an aluminum-manganese alloy having a content of between 0.2 and 2 weight % of Mn is a satisfactory alloy for a cathode foil. This foil has a considerably higher capacitance and impact strength than a pure aluminum foil.

It is an object of the present invention to provide aluminium foil for an electrolytic capacitor having a still higher capacitance value.

The cathode foil according to the present invention consists of aluminium having a copper content between 0.15 and 5.7 weight % and a total of contaminations of not more than 2 weight %.

The basic material satisfies except for copper, for example, DIN-standard 1712 with the following maximum values: (weight %)

Si<0.8%
Fe<1.0%
Mn<0.1%
Ti<0.05%
Zn<0.10%
remaining elements<0.06% each.

Relative to the foil in accordance with the above-mentioned U.S. Patent a cathode in the electrolytic capacitor according to the invention has, after etching the foil at a given number of Coulombs/ cm$^2$, a capacitance which is 2 to 3 times higher. Consequently, the capacitor itself has, compared to the capacitor provided with a cathode in accordance with the above-mentioned U.S. Patent a corresponding improvement of the total capacitance. This means that the thickness of the foil and/or the quantity of etching energy for obtaining a given "etching factor" can be reduced, which results in a capacitor having a more favorable capacitance value per volume unit and a lower energy consumption during etching respectively.

The impact strength of the foil after etching at a given number of Coulombs/cm$^2$ is approximately of the same value as that of the known foil.

By way of non-limitative example there now follows a comparison between the foil in accordance with the above-mentioned U.S. Patent (1) and the foil according to the present invention (2). The relevant compositions are:

| (weight %) | | | |
|---|---|---|---|
| (1) | | (2) | |
| Mn | 1,0% | Mn | 0,04% |
| Cu | 0,10% | Cu | 3,95 |
| Ti | 0,02% | Ti | 0,003 |
| Fe | 0,6% | Fe | 0,04 |
| Si | 0,3% | Si | 0,07 |
| Zn | 0,1% | Zn | <0,01 |
| Mg | 0,2% | Mg | 0,04 |
| Cr | 0,04% | Cr | <0,01 |
| remaining contaminations: | | | |
| each | ≦0,05% | | ≦0,01 |
| together | ≦0,15% | | ≦0,05 |
| Al | remainder | Al | remainder. |

Both foils, having a thickness of 60 μm, were electrolytically etched in an aqueous solution of 250 g/l NaCl with an electric charge of 9.4 and 18.8 Coulombs/cm$^2$.

The capacitance values were measured in a liquid consisting of 5% solution of ammonium-pentaborate in water (resistivity 100φcm) versus a silver-plated counter electrode.

After heating at 240° C. for 1 hour foil (1) had after etching a stabilized capacitance of approximately 100 μF/cm$^2$ (at 9.4 Coulombs/cm$^2$) and 180 μF/cm$^2$ (at 18.8 Coulombs/cm$^2$). However, foil (2) of the present invention had, after etching with an electric charge of 9.4 Coulombs/cm$^2$, a capacitance of 240 μF/cm$^2$.

The impact strength was 350 mJ/15 mm foil width (9.4 Coulombs/cm$^2$) and 250 mJ/15 mm of foil width (18.8 Coulombs/cm$^2$) for foil (1) and 450 mJ/15 mm foil width after etching with an electric charge of 9.4 Coulombs/cm$^2$ for foil (2).

The capacitance of wound bodies as a function of the operating voltage of electrolytic capacitors is stated with foils (1) and (2) respectively as a cathode.

| Operating voltage (Volts) | Capacitance with cathode (1) of 100 μF/cm$^2$ | wound body (2) of 240 μF/cm$^2$ | gain in volume per cap. unit of wound body in % |
|---|---|---|---|
| 6,3 | 36,3 μF/cm$^2$ | 46,1 μF/cm$^2$ | 27 |
| 10 | 28,6 μF/cm$^2$ | 34,3 μF/cm$^2$ | 20 |
| 25 | 14,5 μF/cm$^2$ | 15,9 μF/cm$^2$ | 9 |
| 40 | 9,75 μF/cm$^2$ | 10,33 μF/cm$^2$ | 6 |
| 63 | 5,66 μF/cm$^2$ | 5,85 μF/cm$^2$ | 3 |

By reducing the thickness of the foil from 60 μm to 30 μm at the same capacitance a gain of 12% in volume is obtained.

The following table is a survey of a 10 volt capacitor wherein the wound section is impregnated with a conventional glycol-ammonia-boric acid-electrolyte solution.

| | | | | |
|---|---|---|---|---|
| Cath. 60μm foil | 100μF/cm² | | 240μF/cm² | |
| 30μm foil | | 100μF/cm² | | 240μF/cm² |
| Anode 100μm foil | 40μF/cm² | 40μF/cm² | 40μF/cm² | 40μF/cm² |
| Paper 2 × 60 μm body thickness | 280μm | 250μm | 280μm | 250μm |
| wound body cap/cm² | 28,6μF/cm² | 28,6μF/cm² | 34,3μF/cm² | 34,3μF/cm² |

Because the cathode capacitance of 240 μF/cm² is attained upon etching with an electric charge of only 9.4 Coulombs/cm² the decrease in strength of the foil is so small that a foil having this capacitance can be made with a thickness of 30 μum.

What is claimed is:

1. A cathode foil of aluminum for electrolytic capacitors, characterized in that the foil consists of aluminum having a content of copper between 0.15 and 5.7 weight % and a total of contaminations of not more than 2 weight % wherein said contaminations consist of less than 1.0 weight % of iron.

2. A cathode foil as claimed in claim 1, which is etched for enlarging the surface area.

3. An electrolytic foil capacitor whose cathode consists of foil as claimed in claim 1, which has been given an enlarged surface area by means of etching.

4. A cathode foil as claimed in claim 1, wherein said contaminations consist of no more than 0.04 weight % of iron.

5. A cathode foil as claimed in claim 1, wherein said foil has a content of copper being at least 3.95 weight %.

6. An electrolytic foil capacitor as claimed in claim 3, wherein said contaminations consist of no more than 0.04 weight % of iron.

7. An electrolytic foil capacitor as claimed in claim 3, wherein said foil has a content of copper being at least 3.95 weight %.